United States Patent
Madara et al.

(10) Patent No.: US 8,136,847 B2
(45) Date of Patent: Mar. 20, 2012

(54) COUPLING HAVING ANGULARLY ORIENTED SHOULDER SURFACES

(75) Inventors: Scott D. Madara, Nazareth, PA (US); John W. Pierce, Nazareth, PA (US); Vance W. Henry, Easton, PA (US); Charles E. Wilk, Northampton, PA (US); Douglas R. Dole, Whitehouse Station, NJ (US)

(73) Assignee: Victaulic Company, Easton, PA (US)

( * ) Notice: Subject to any disclaimer, the term of this patent is extended or adjusted under 35 U.S.C. 154(b) by 370 days.

(21) Appl. No.: 12/466,083

(22) Filed: May 14, 2009

(65) Prior Publication Data

US 2010/0289257 A1    Nov. 18, 2010

(51) Int. Cl.
    *F16L 23/00*    (2006.01)
(52) U.S. Cl. ..................................... 285/367; 29/525.02
(58) Field of Classification Search .................. 285/365, 285/366, 367, 364, 411, 410, 111, 112; 29/428, 29/525.02
See application file for complete search history.

(56) References Cited

U.S. PATENT DOCUMENTS

| | | | |
|---|---|---|---|
| 1,867,891 A * | 7/1932 | Reynolds | 285/112 |
| 2,225,208 A * | 12/1940 | Crickmer | 285/112 |
| 2,439,979 A | 4/1948 | Kroos | |
| 2,449,795 A * | 9/1948 | Stillwagon | 285/112 |
| 2,473,046 A | 6/1949 | Adams, Jr. | |
| 2,926,028 A * | 2/1960 | Hookings et al. | 285/111 |
| 3,291,506 A | 12/1966 | Blakely | |
| 3,351,352 A | 11/1967 | Blakely et al. | |
| 3,967,837 A * | 7/1976 | Westerlund et al. | 285/112 |
| 4,471,979 A * | 9/1984 | Gibb et al. | 285/112 |
| 4,522,434 A | 6/1985 | Webb | |
| 4,601,495 A | 7/1986 | Webb | |
| 5,058,931 A * | 10/1991 | Bowsher | 285/112 |
| 5,080,400 A * | 1/1992 | Adamek et al. | 285/367 |
| 6,502,865 B1 * | 1/2003 | Steele | 285/112 |
| 6,533,333 B1 * | 3/2003 | Radzik | 285/367 |
| 6,832,791 B2 * | 12/2004 | Legeai et al. | 285/364 |
| 7,086,131 B2 * | 8/2006 | Gibb et al. | 29/282 |
| 7,090,259 B2 | 8/2006 | Dole | |
| 7,712,796 B2 * | 5/2010 | Gibb et al. | 285/411 |
| 7,726,703 B2 * | 6/2010 | Porter et al. | 285/367 |
| 7,950,701 B2 * | 5/2011 | Dole et al. | 285/367 |

FOREIGN PATENT DOCUMENTS

| | | |
|---|---|---|
| EP | 0178360 | 7/1985 |
| GB | 2243659 | 11/1991 |
| WO | 0057093 | 9/2000 |
| WO | 2007145995 | 12/2007 |

* cited by examiner

*Primary Examiner* — David E Bochna
(74) *Attorney, Agent, or Firm* — Ballard Spahr LLP (57) ABSTRACT

A mechanical pipe coupling is formed of segments attached end to end to surround a central space. Each segment has a circumferentially extending cavity facing the central space flanked by arcuate keys which project toward the central space. Two arcuate shoulder surfaces are positioned on each segment. The arcuate shoulder surfaces face the central space and are positioned in spaced relation on opposite sides of the cavity between the cavity and the arcuate keys. The arcuate shoulder surfaces are angularly oriented with respect to an axis perpendicular to a plane containing the segments. The coupling is used to couple pipe elements having a circumferential ring located at the ends of the pipe elements. The angular orientation of the arcuate shoulder surfaces provides flexibility to the joint. A method of joining pipe elements having circumferential rings is also disclosed.

51 Claims, 9 Drawing Sheets

COUPLING HAVING ANGULARLY ORIENTED SHOULDER SURFACES

FIELD OF THE INVENTION

This invention relates to mechanical couplings for flexibly joining pipe elements in end to end relation.

BACKGROUND

Mechanical pipe couplings provide various advantages over other techniques for joining pipe elements end to end. For example, they are less expensive to install than welded joints, which require skilled welders and the use of an exposed flame or arc, which are not practical or safe in every environment. Mechanical couplings may also be designed to afford a degree of flexibility at the joint, unlike welded joints which are substantially rigid. Flexibility is desired because it facilitates design and assembly of the piping network, allowing for larger dimensional and angular tolerances. Couplings which permit flexibility also impose lower stresses on pipe elements when external forces are applied to the pipes. Flexibility also allows for greater expansion and contraction under temperature changes without compromising the fluid tight integrity of the various joints. It would be advantageous to have a mechanical pipe coupling which is usable to join pipe elements having circumferential rings located at the ends of each pipe element and which provides for angular flexibility of the pipe elements without compromising the fluid tight integrity of the joint.

SUMMARY

The invention concerns a coupling for joining pipe elements together in end to end relation. The coupling comprises a plurality of segments attached to one another end to end surrounding a central space. At least one of the segments has a cavity therein. The cavity faces the central space and extends lengthwise along the one segment. The one segment further comprises an arcuate key extending lengthwise along the one segment. The arcuate key is positioned in spaced relation to the cavity and projects inwardly toward the central space. The one segment further comprises an arcuate shoulder surface extending lengthwise along the one segment. The arcuate shoulder surface faces the central space and is positioned between the cavity and the arcuate key. The arcuate shoulder surface is angularly oriented with respect to an axis oriented perpendicularly to a plane containing the segments. The arcuate shoulder surface is engageable with an outer surface of one of the pipe elements when the one pipe element is positioned within the central space.

In one embodiment, the arcuate shoulder surface is oriented such that the distance between the arcuate shoulder surface and the axis increases with increasing distance along the axis in a direction away from the central space. In another embodiment the arcuate shoulder surface is oriented such that the distance between the arcuate shoulder surface and the axis increases with increasing distance along the axis in a direction toward the central space.

The arcuate shoulder surface may have an orientation angle between about 1° and about 5°. In one embodiment, the arcuate shoulder surface has an orientation angle of about 3°.

The coupling according to the invention may further comprise a second arcuate shoulder surface positioned between the first arcuate shoulder surface and the central space. The second arcuate shoulder surface is also angularly oriented with respect to the axis and has a slope opposite to the slope of the first arcuate shoulder surface.

In one embodiment, the coupling according to the invention comprises two of the segments. The segments may be attached to one another in spaced apart relation.

The coupling may further comprise connection members positioned at opposite ends of the segments for adjustably connecting one coupling segment to another. The connection members are adjustably tightenable for drawing the arcuate shoulder surface into engagement with the outer surface of the pipe element. The arcuate shoulder surface may subtend an angle of less than 180° and have a radius of curvature greater than the radius of curvature of the outer surface of the pipe element. At least the one segment is deformable upon adjustable tightening of the connection members so as to substantially conform the curvature of a portion of the arcuate shoulder surface to the outer surface of the pipe element. The arcuate key may also subtend an angle of less than 180° and have a radius of curvature greater than the radius of curvature of the outer surface of the pipe element.

The coupling for joining pipe elements together in end to end relation according to the inventions may also be described as comprising a plurality of segments attached to one another end to end surrounding a central space. At least one of the segments has a cavity therein, the cavity facing the central space and extending lengthwise along the one segment. An arcuate key extends lengthwise along the one segment, the arcuate key being positioned in spaced relation to the cavity and projecting inwardly toward said central space. The one segment further comprises an arcuate shoulder surface extending lengthwise along said one segment. The arcuate shoulder surface faces the central space and is positioned between the cavity and the arcuate key. The arcuate shoulder surface has a first boundary adjacent to the key and a second boundary adjacent to the cavity. The first boundary has a first radius of curvature, and the second boundary has a second radius of curvature. The first radius of curvature may be greater or smaller than the second radius of curvature.

The arcuate shoulder surface in the various embodiments may have a curved cross sectional profile.

The invention also encompasses a method of joining pipe elements in end to end relationship using a coupling formed of a plurality of segments connected end to end by a plurality of adjustably tightenable fasteners. The segments are connected to one another in spaced apart relation. The segments surround a central space. At least one of the segments has a cavity therein. The cavity faces the central space and extends lengthwise along the one segment. The one segment further comprises an arcuate key extending lengthwise along the one segment. The arcuate key is positioned in spaced relation to the cavity and projects inwardly toward the central space. The one segment further comprises an arcuate shoulder surface extending lengthwise along the one segment. The arcuate shoulder surface faces the central space and is positioned between the cavity and the arcuate key. The arcuate shoulder surface is angularly oriented with respect to an axis oriented perpendicularly to a plane containing the segments. The method comprises:

(a) inserting the pipe elements into the central space from opposite sides of the coupling;
(b) tightening the fasteners so as to draw the segments toward one another and thereby engaging the arcuate shoulder surface with an outer surface of at least one of the pipe elements.

Furthermore, the arcuate shoulder surface may subtend an angle of less than 180° and have a radius of curvature greater than the radius of curvature of the outer surface of the one pipe element. In this embodiment the method further comprises deforming at least the one segment upon adjustable tightening of the connection members so as to substantially conform the curvature of a portion of the arcuate shoulder surface to the outer surface of the one pipe element.

The invention also includes, in combination, a pair of pipe elements and a coupling joining the pipe elements together in end to end relation. Each of the pipe elements comprises a circumferential ring located at an end of each pipe element. The circumferential rings extend radially outwardly. The coupling comprises a plurality of segments attached to one another end to end surrounding a central space. Each segment has a cavity therein. Each cavity faces the central space and extends lengthwise along each segment. Each segment further comprises a pair of arcuate keys extending lengthwise along each segment and projecting inwardly toward the central space. The arcuate keys are positioned in spaced relation to one another on opposite sides of the cavity. Each segment further comprises a pair of arcuate shoulder surfaces extending lengthwise along each segment and facing the central space. The arcuate shoulder surfaces are positioned in spaced relation to one another on opposite sides of the cavity. Each arcuate shoulder surface is positioned between one of the arcuate keys and the cavity. The arcuate shoulder surfaces are angularly oriented with respect to an axis oriented perpendicularly to a plane containing the segments. The ends of each of the pipe elements are positioned in end to end relation within the central space. Each of the arcuate shoulder surfaces is engaged with an outer surface of one of the circumferential rings positioned at the ends of the pipe elements.

In one embodiment, the arcuate shoulder surfaces on each of the segments are oriented such that the distance between the arcuate shoulder surfaces and the axis increases with increasing distance along the axis in a direction away from the central space.

In another embodiment, the arcuate shoulder surfaces on each of the segments are oriented such that the distance between the arcuate shoulder surfaces and the axis increases with increasing distance along the axis in a direction toward the central space.

The arcuate shoulder surfaces may have an orientation angle between about 1° and about 5°. In one embodiment, the arcuate shoulder surfaces have an orientation angle of about 3°.

The coupling may further comprise connection members positioned at opposite ends of the segments for adjustably connecting the coupling segments to one another. The connection members are adjustably tightenable for drawing the arcuate shoulder surfaces into engagement with the outer surfaces of the circumferential rings. The arcuate shoulder surfaces may subtend an angle of less than 180° and have a radius of curvature greater than the radius of curvature of the outer surfaces of the circumferential rings. The segments are deformable upon adjustable tightening of the connection members so as to substantially conform the curvature of a portion of the arcuate shoulder surfaces to the outer surfaces of the circumferential rings.

The arcuate keys may also subtend an angle of less than 180° and have a radius of curvature greater than the radius of curvature of the outer surface of the pipe elements.

DETAILED DESCRIPTION OF EMBODIMENTS

Figure 1:
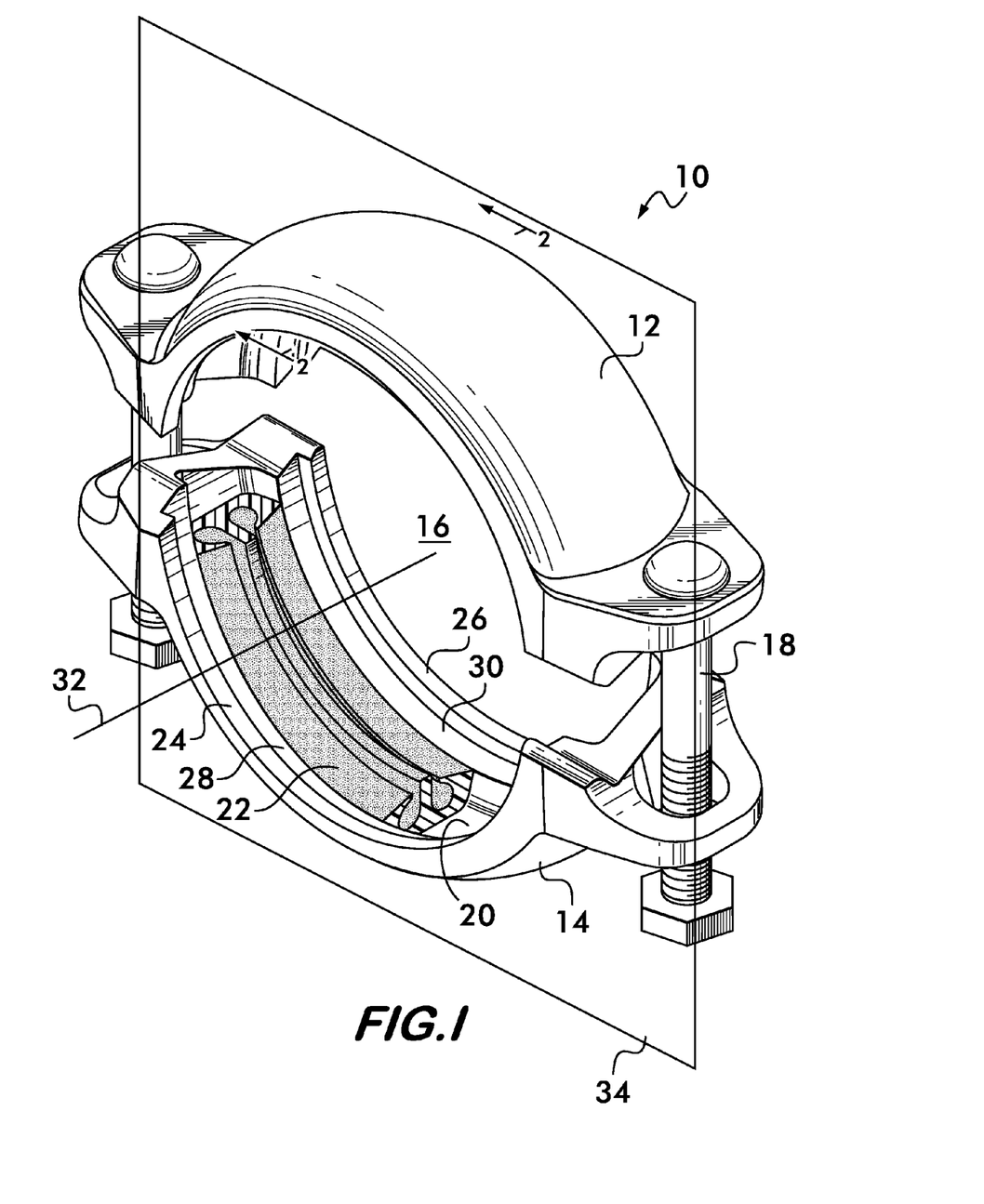
FIG. 1 is an isometric view of an example coupling according to the invention.

FIG. 1 shows a coupling 10 according to the invention. Coupling 10 is formed of a plurality of segments, in this example embodiment, two segments 12 and 14. The segments are attached to one another end to end surrounding a central space 16. Attachment of the segments is effected by connection members, for example, adjustably tightenable fasteners 18 positioned at each end of the segments and which, upon tightening, draw the segments toward one another. The segments 12 and 14 are attached to one another in spaced relation to allow pipe elements to be inserted into the central space 16 prior to tightening fasteners 18 as described in detail below.

Figure 2:
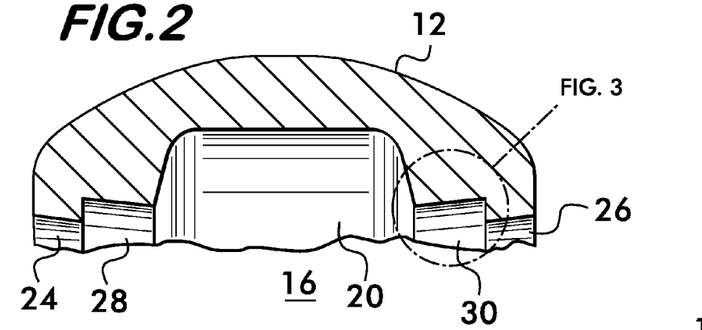
FIG. 2 is a partial sectional view taken at line 2-2 of FIG. 1.

The segments 12 and 14 each have a cavity 20 which faces the central space 16 and extends lengthwise along the segments. Cavity 20 receives a seal 22 which ensures a fluid tight joint between the pipe elements joined by the coupling. Each segment 12 and 14 also has a pair of arcuate keys 24 and 26 which extend lengthwise along the segments. Keys 24 and 26 are positioned in spaced relation to one another on opposite sides of the cavity 20 and project inwardly toward the central space 16. Each segment 12 and 14 also has a pair of arcuate shoulder surfaces 28 and 30. The arcuate shoulder surfaces 28 and 30 are also positioned in spaced relation from one another on opposite sides of the cavity 20, and each arcuate shoulder surface is positioned between the cavity 20 and one of the arcuate keys 24 and 26. As shown in FIGS. 1 and 2, arcuate shoulder surface 28 is positioned between cavity 20 and key 24, and arcuate shoulder surface 30 is positioned between cavity 20 and key 26.

The arcuate shoulder surfaces 28 and 30 are angularly oriented with respect to an axis 32 which is perpendicular to a plane 34 which contains the segments 12 and 14. In one embodiment, shown in FIG. 3, the arcuate shoulder surfaces, represented by surface 30, are oriented such that the distance 36 between the arcuate shoulder surfaces and the axis 32 increases with increasing distance along the axis in a direction away from the central space 16 as indicated by arrow 38. Arcuate shoulder surfaces 28 and 30 may have an orientation angle 40 from about 1° to about 5°, with an orientation angle of about 3° being advantageous. Both arcuate shoulder surfaces may have the same orientation angles, or the angles may be different from one another.

Figures 3, 4:
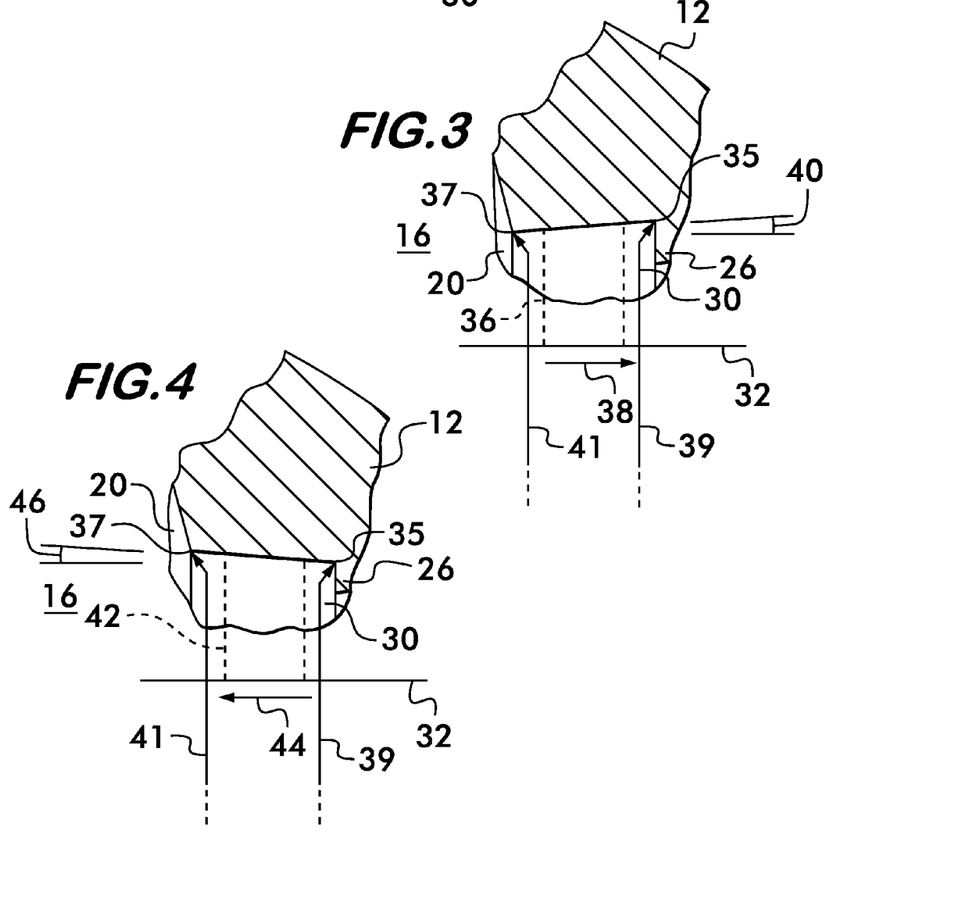
FIG. 3 is a view of a portion of the sectional view of FIG. 2 taken at circle 3 and shown on an enlarged scale.
FIG. 4 is a view of a portion of a sectional view of an alternate coupling embodiment.
Figures 3A, 3B, 4A:
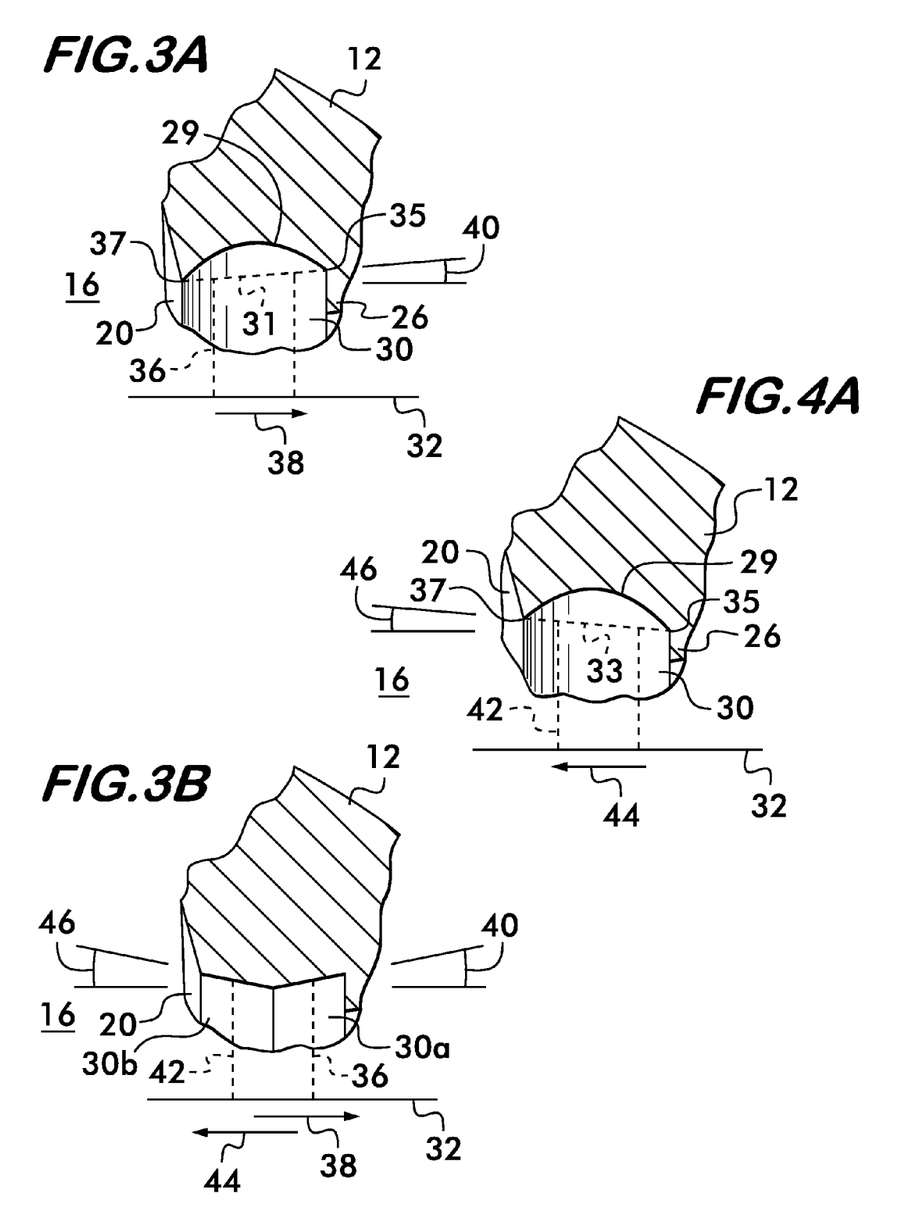
FIGS. 3A and 3B show alternate embodiments of the coupling according to the invention.
FIG. 4A shows an alternate embodiment of the coupling according to the invention.

FIG. 3A shows an alternate embodiment wherein the arcuate shoulder surfaces, represented by surface 30, have a curved cross sectional profile 29. The orientation angle 40 for this embodiment is defined as a secant line 31 between the end points of the curve defining the surface 30. Similar to the embodiment shown in FIG. 3, the orientation angle of the now curved surface 30 may range from about 1° to about 5°, with an orientation angle of about 3° being advantageous. The orientation of the secant line 31 is such that its distance 36 from axis 32 increases in the direction 38 of increasing distance away from the central space 16.

In another embodiment, shown in FIG. 4, the arcuate shoulder surfaces, again represented by surface 30, are oriented such that the distance 42 between the arcuate shoulder surfaces and the axis 32 increases with increasing distance along the axis in a direction toward the central space 16 as indicated by arrow 44. Arcuate shoulder surfaces 28 and 30 may have an orientation angle 46 from about 1° to about 5°, with an orientation angle of about 3° being advantageous. Both arcuate shoulder surfaces may have the same orientation angles, or the angles may be different from one another.

FIG. 4A shows another alternate embodiment wherein the arcuate shoulder surfaces, represented by surface 30 have a curved cross sectional profile 29. The orientation angle 46 for this embodiment is defined as a secant line 33 between the end points of the curve defining the surface 30. Similar to the embodiment shown in FIG. 4, the orientation angle of the now curved surface 30 may range from about 1° to about 5°, with an orientation angle of about 3° being advantageous. The orientation of the secant line 33 is such that its distance 42 from axis 32 increases in the direction 44 of decreasing distance from the central space 16.

The embodiments shown in FIGS. 3 and 4 may also be described with respect to the boundaries that define the arcuate shoulder surfaces 28 and 30. For example, as shown in FIG. 3, surface 30 has a first boundary 35 positioned adjacent to the key 26 and a second boundary 37 positioned adjacent to the cavity 20. The surface 30 being arcuate and angularly oriented, the first boundary 35 consequently has a radius of curvature 39 and the second boundary 37 has a radius of curvature 41. In this embodiment, wherein the distance 36 increases with increasing distance in the direction 38 away from the central space 16, the radius 39 of the first boundary 35 is greater than the radius 41 of the second boundary 37. For the embodiment shown in FIG. 4, wherein the surface 30 has an opposite slope, the radius 41 of the second boundary 37 is greater than the radius 39 of the first boundary 35.

In the alternate embodiment shown in FIG. 3B, the shoulder surface is divided into first and second angularly oriented portions 30a and 30b. Surface portion 30a may be considered the first arcuate surface portion, and surface portion 30b may be considered the second arcuate surface portion, located between the first portion 30a and the central space 16. The portions have opposite slopes, resulting in the distance 36 between surface 30a and the axis 32 increasing with increasing distance in the direction 38 away from the central space 16, and the distance 42 between surface 30b and the axis 32 increasing with decreasing distance in the direction 44 toward the central space 16. The respective orientation angles 40 and 46 of the surfaces 30a and 30b may range from about 1° to about 5°, with an orientation angle of about 3° being advantageous. The orientation angles need not be the same for both surfaces 30a and 30b.

Figure 5:
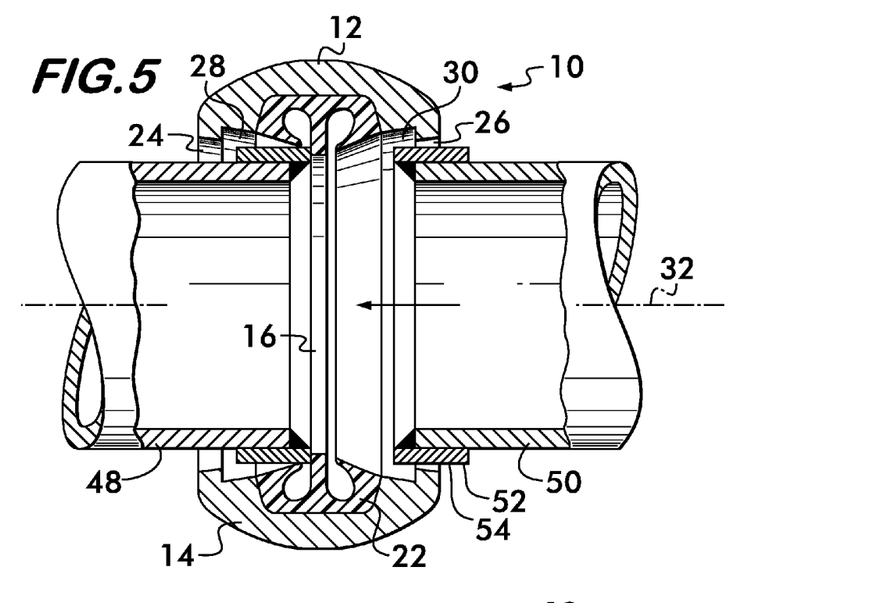
FIGS. 5 and 6 are longitudinal section views illustrating a method of using a coupling according to the invention to join pipe elements in end to end relation.

As shown in FIG. 5, couplings 10 are designed to join pipe elements 48 and 50 in end to end relation. Pipe elements 48 and 50 each have circumferential rings 52 positioned at ends of the pipe element. The rings extend radially outwardly and form the outer surface of the pipe elements. Rings 52 facilitate engagement between the coupling and the pipe elements. The rings 52 may be separate components attached to the pipe elements, for example by welding as shown, or adhesively bonded for non-metallic pipes. Alternately, the rings 52 may be integrally formed at the ends of pipe elements 48 and 50.

Figure 6:
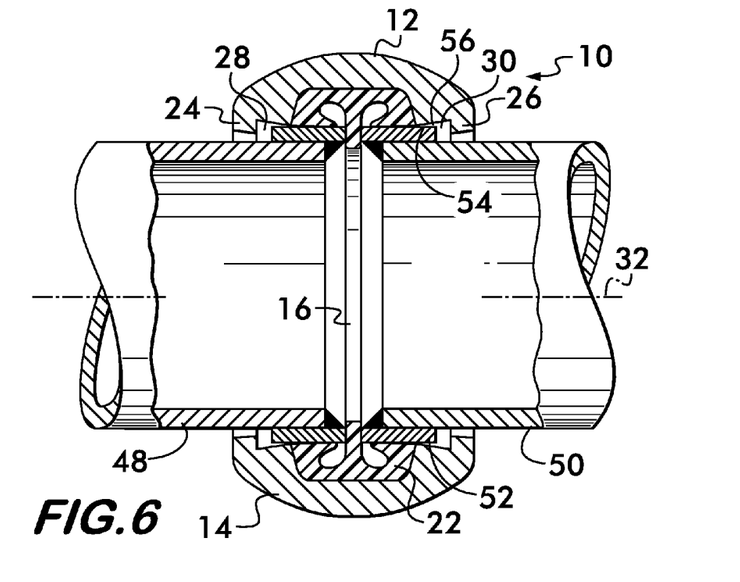
Figure 7:
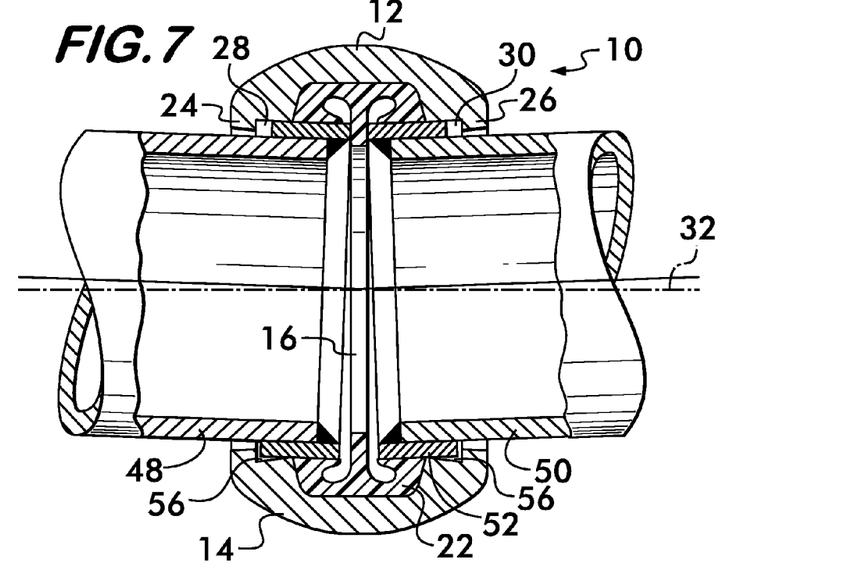
FIG. 7 is a longitudinal sectional view illustrating the flexibility afforded by pipe couplings according to the invention.

A method of assembly of a pipe joint using the coupling 10 according to the invention is illustrated with reference to FIGS. 1, 5 and 6. As shown in FIG. 1, segments 12 and 14 are provided connected to one another in spaced apart relation by adjustably tightenable fasteners 18. Preferably the segments are connected at the factory where they are produced, and provided to the end user with the segments in spaced apart relation to facilitate assembly of the pipe joint. As shown in FIG. 5, pipe elements 48 and 50 are then inserted into the central space 16 from opposite sides of the coupling 10. Upon insertion, the outer surfaces 54 of the circumferential rings 52 engage the seal 22. Next the fasteners are tightened, drawing the segments toward one another, whereupon the arcuate shoulder surfaces 28 and 30 each engage a respective outer surface 54 of the pipe elements 48 and 50, those outer surfaces also including the outer surfaces of the rings 52. As shown in FIG. 6, the angular orientation of the arcuate shoulder surfaces 28 and 30 permits a gap 56 to form between the pipe outer surfaces 54 and the arcuate shoulder surfaces 28 and 30 which widens in a direction along the axis 32 away from the central space 16. This angular orientation of the arcuate shoulder surfaces 28 and 30 (see also FIG. 3) provides flexibility to the joint, allowing the pipe elements to flex relatively to one another in bending as shown in FIG. 7. The relative displacement of the pipe elements does not impose significant stress on the coupling 10, which is able to retain the pipe elements 48 and 50 while maintaining a fluid tight joint.

Figure 8:
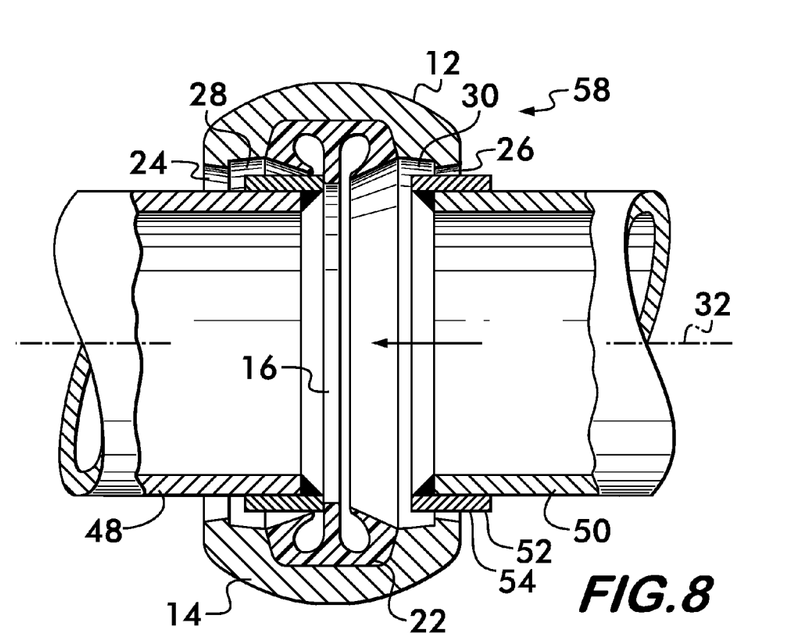
FIGS. 8 and 9 are longitudinal section views illustrating a method of using a coupling according to the invention to join pipe elements in end to end relation.
Figure 9:
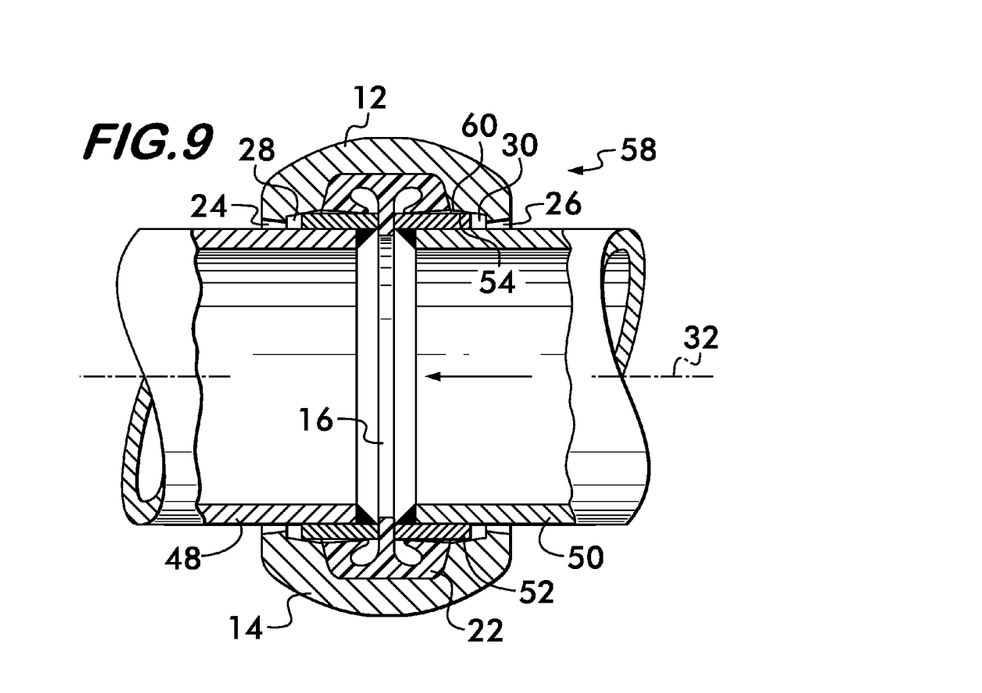
Figure 10:
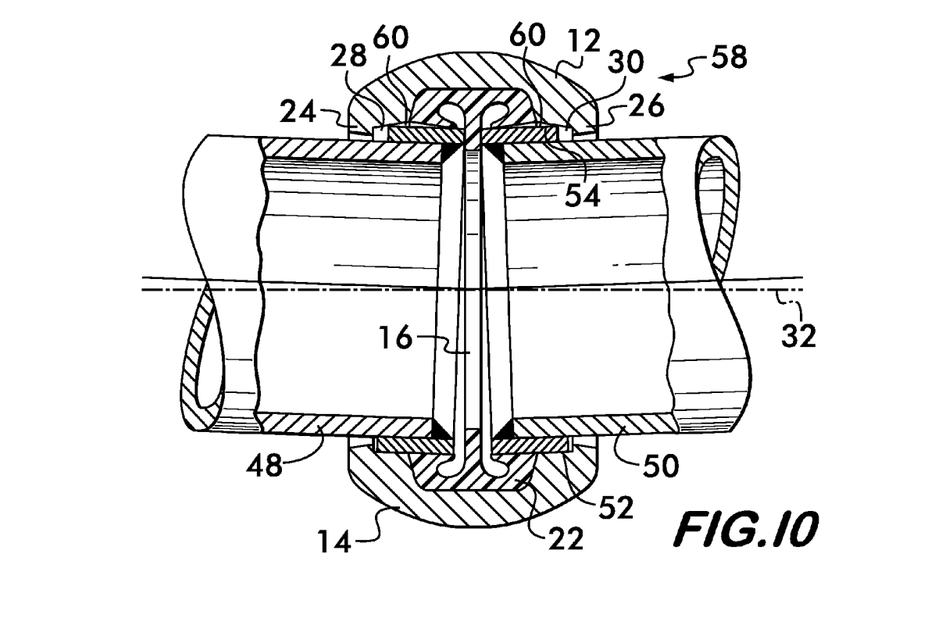
FIG. 10 is a longitudinal sectional view illustrating the flexibility afforded by pipe couplings according to the invention.

An alternate coupling embodiment 58 is shown in FIGS. 8-10, wherein the arcuate shoulder surfaces 28 and 30 have an angular orientation which decreases with increasing distance along axis 32 in the direction away from the central space 16 (see also FIG. 4). The method using this coupling embodiment is substantially the same as previously described. The coupling 58 is provided with the segments 12 and 14 connected in spaced apart relation. Pipe elements 48 and 50 are inserted into the central space 16 from opposite sides of the coupling 58, and adjustable fasteners are tightened to draw the segments toward one another. The arcuate shoulder surfaces 28 and 30 engage the outer surfaces 54 of the circumferential rings 52. As shown in FIG. 9, a gap 60 is formed between the arcuate shoulder surfaces 28 and 30 and the ring outer surfaces 54. In this embodiment the gap decreases with increasing distance along axis 32 from the central space 16. The angular orientation of the arcuate shoulder surfaces 28 and 30 provides flexibility to the joint, allowing the pipe elements to flex relatively to one another in bending as shown in FIG. 10. The relative displacement of the pipe elements does not impose significant stress on the coupling 58, which is able to retain the pipe elements 48 and 50 while maintaining a fluid tight joint.

Figure 10A:
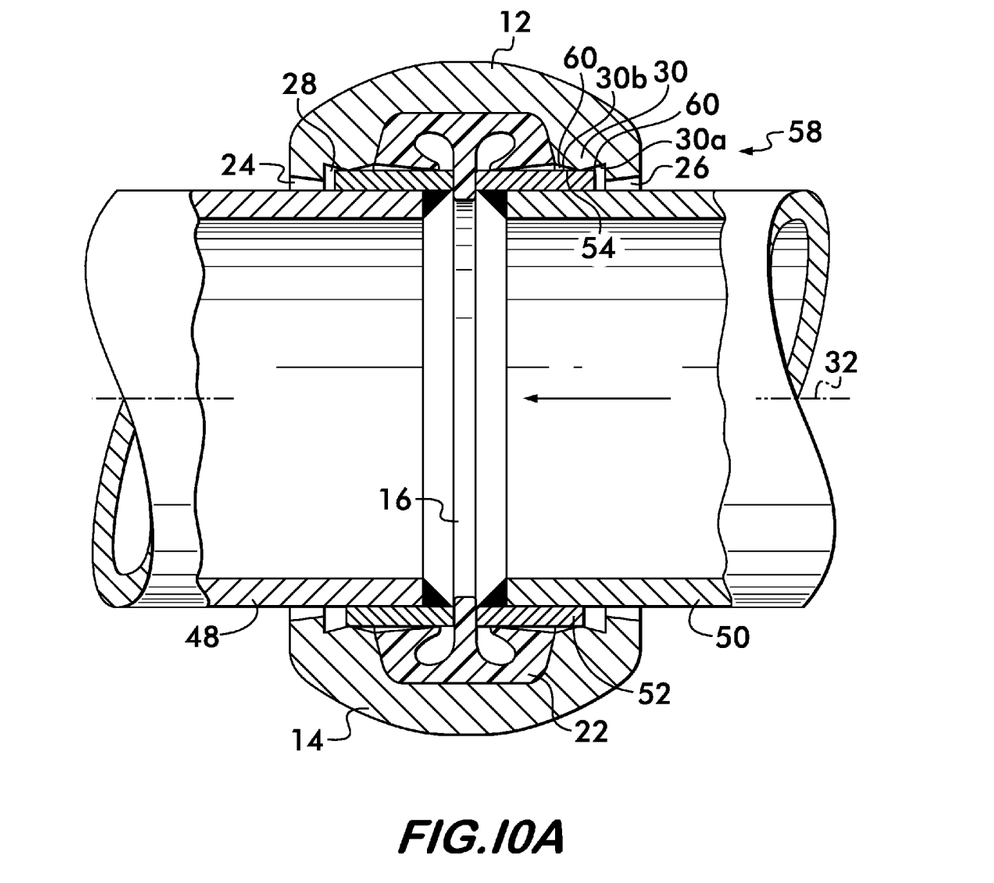
FIG. 10A is a longitudinal sectional view illustrating an alternate embodiment of a pipe coupling according to the invention.

FIG. 10A depicts a joint formed by couplings having first and second arcuate shoulder surfaces 30a and 30b as shown in detail in FIG. 3B. Gaps 60 form between both surfaces 30a and 30b and the outside surface of pipes 48 and 50. The behavior of this embodiment is similar to those described above.

Figure 11:
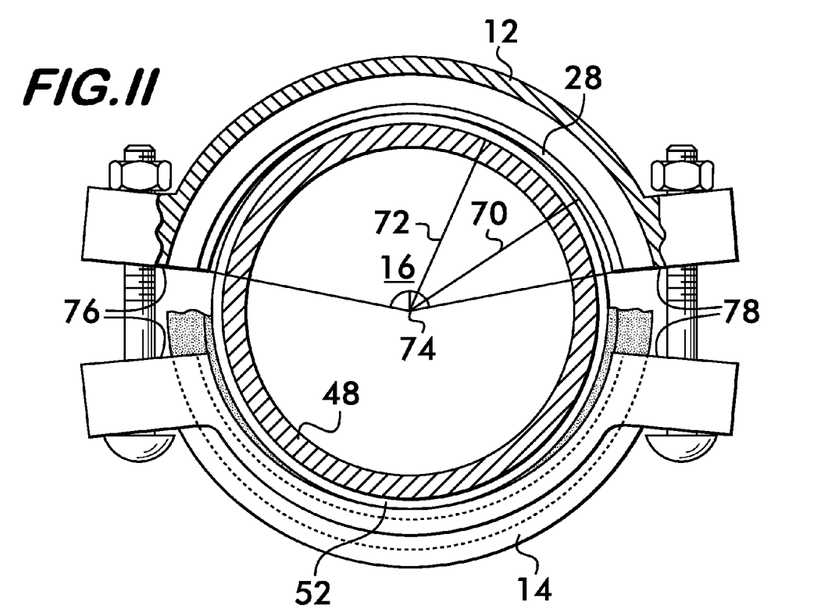
FIGS. 11 and 12 are partial cross sectional views of an alternate embodiment of a coupling according to the invention.
Figure 12:
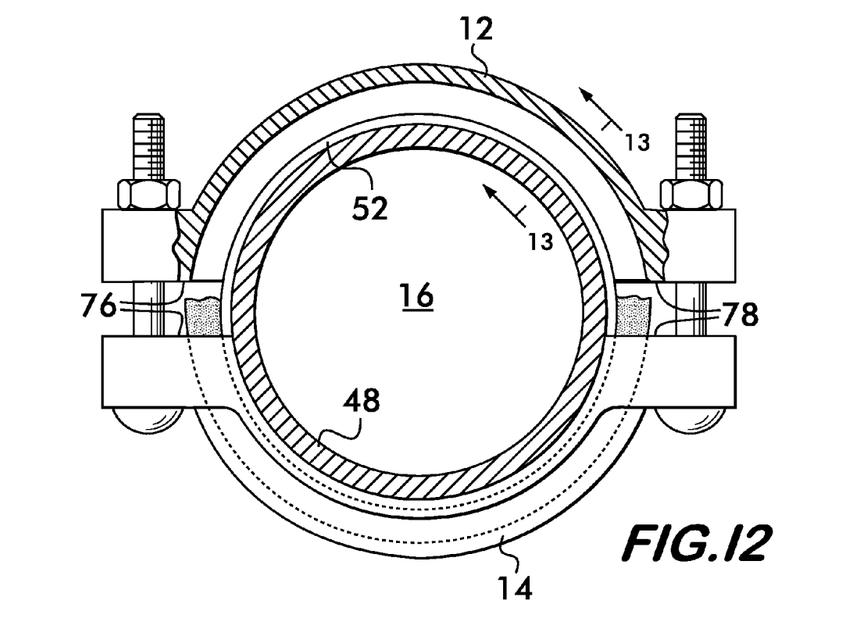
Figure 13:
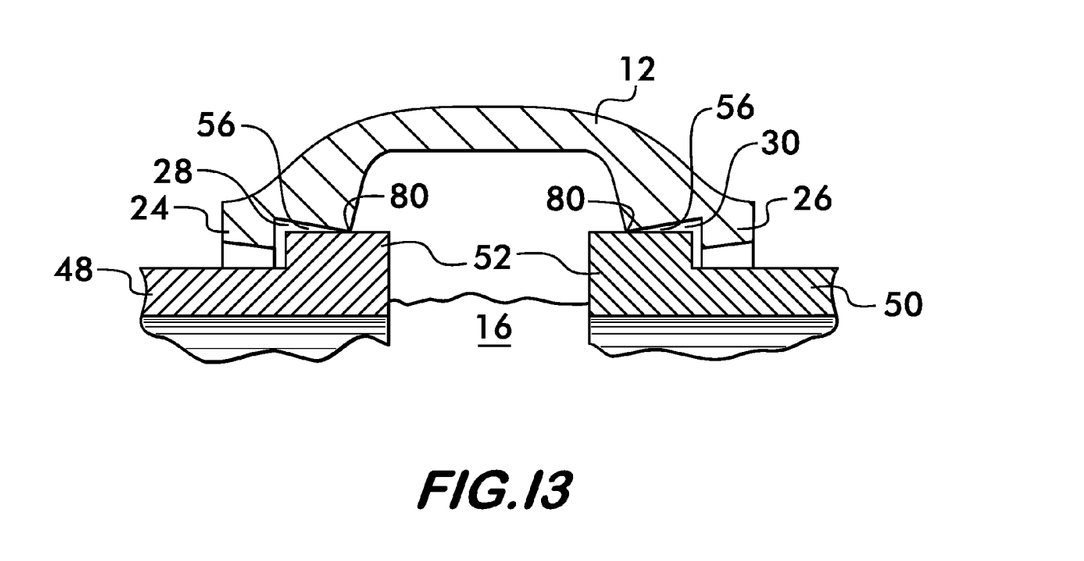
FIG. 13 is a partial sectional view taken at line 13-13 of FIG. 12.

As shown in FIG. 11, to provide sufficient clearance between segments 12 and 14 when they are connected to one another in spaced relation so that the pipe elements 48 and 50 may be inserted into the central space 16 without disassembling the coupling 10, it is advantageous that the minimum radius of curvature 70 of the arcuate shoulder surfaces 28 and 30 (30 not shown) be greater than the radius 72 of the circumferential rings 52 on the pipe elements. It is further advantageous that the angle 74 subtended by the arcuate shoulder surfaces 28 and 30 be less than 180°. As shown in FIG. 11, this configuration of arcuate shoulder surface radius and subtended angle provides clearance between the circumferential rings 52 and the ends 76 and 78 of segments 12 and 14. This end clearance permits a closer spacing of the segments while still allowing insertion of the pipe elements which, in turn, allows fasteners 18 to be shorter and thereby yields a practical design. When the fasteners are tightened to draw the segments toward one another and effect engagement between the circumferential rings 52 and the arcuate shoulder surfaces 28 and 30 (see FIG. 12) the segments deform so as to substantially conform a portion 80 of the arcuate shoulder surfaces 28 and 30 to the outer surface of the pipe elements as shown in FIG. 13. Portion 80 extends circumferentially around the segments 12 and 14 but does not include the entire area of the arcuate shoulder surfaces 28 and 30, the gap 56 still being present to ensure flexibility and permit deflections of the pipe elements 48 and 50.

When used to couple pipes having circumferential rings the angularly oriented arcuate shoulder surfaces of the coupling embodiments 10 and 58 according to the invention provide for a significant degree of angular flexibility without compromising the fluid tight integrity of the joint.

What is claimed is:

1. A coupling for joining pipe elements together in end to end relation, said coupling comprising:
   a plurality of segments attached to one another end to end surrounding a central space, at least one of said segments having a cavity therein, said cavity facing said central space and extending lengthwise along said one segment;
   said one segment further comprising an arcuate key extending lengthwise along said one segment, said arcuate key being positioned in spaced relation to said cavity and projecting inwardly toward said central space;
   said one segment further comprising a first arcuate shoulder surface extending circumferentially along the length of said one segment, said first arcuate shoulder surface facing said central space and being positioned contiguous with said cavity and between said cavity and said arcuate key, said first arcuate shoulder surface being angularly oriented with respect to an axis oriented perpendicularly to a plane containing said segments, said first arcuate shoulder surface being engageable with an outer surface of one of said pipe elements when said one pipe element is positioned within said central space.

2. The coupling according to claim 1, wherein said first arcuate shoulder surface is oriented such that the distance between said first arcuate shoulder surface and said axis increases with increasing distance along said axis in a direction away from said central space.

3. The coupling according to claim 1, wherein said first arcuate shoulder surface is oriented such that the distance between said first arcuate shoulder surface and said axis increases with increasing distance along said axis in a direction toward said central space.

4. The coupling according to claim 1, wherein said first arcuate shoulder surface has an orientation angle between about 1° and about 5°.

5. The coupling according to claim 1, wherein said first arcuate shoulder surface has an orientation angle of about 3°.

6. The coupling according to claim 1, wherein said first arcuate shoulder surface has a curved cross sectional profile.

7. The coupling according to claim 1, further comprising a second arcuate shoulder surface positioned between said first arcuate shoulder surface and said arcuate key, said second arcuate shoulder surface being angularly oriented with respect to said axis and having a slope opposite to a slope of said first arcuate shoulder surface.

8. The coupling according to claim 7, wherein said second arcuate shoulder surface has an orientation angle between about 1° and about 5°.

9. The coupling according to claim 7, wherein said second arcuate shoulder surface has an orientation angle of about 3°.

10. The coupling according to claim 1 comprising two said segments.

11. The coupling according to claim 1, wherein said segments are attached to one another in spaced apart relation.

12. The coupling according to claim 1, further comprising a seal located within said cavity.

13. The coupling according to claim 1, further comprising:
   connection members positioned at opposite ends of said segments for adjustably connecting one coupling segment to another, said connection members being adjustably tightenable for drawing said arcuate shoulder surface into engagement with said outer surface of said pipe element; and
   wherein said first arcuate shoulder surface subtends an angle of less than 180° and has a minimum radius of curvature greater than the radius of curvature of said outer surface of said pipe element, at least said one segment being deformable upon adjustable tightening of said connection members so as to substantially conform the curvature of a portion of said first arcuate shoulder surface to the outer surface of said pipe element.

14. The coupling according to claim 13, wherein said arcuate key subtends an angle of less than 180° and has a radius of curvature greater than the radius of curvature of said outer surface of said pipe element.

15. The coupling according to claim 14, wherein said segments are attached to one another in spaced apart relation.

16. A coupling for joining pipe elements together in end to end relation, said coupling comprising:
   a plurality of segments attached to one another end to end surrounding a central space, each said segment having a cavity therein, each said cavity facing said central space and extending lengthwise along each said segment;
   each said segment further comprising a pair of arcuate keys extending lengthwise along each said segment and projecting inwardly toward said central space, said arcuate keys being positioned in spaced relation to one another on opposite sides of said cavity;
   each said segment further comprising a pair of first arcuate shoulder surfaces extending circumferentially along the length of each said segment and facing said central space, said first arcuate shoulder surfaces being positioned in spaced relation to one another on opposite sides of said cavity, each said first arcuate shoulder surface being positioned contiguous with said cavity and between a respective one of said keys and said cavity, said first arcuate shoulder surfaces being angularly oriented with respect to an axis oriented perpendicularly to a plane containing said segments, said first arcuate shoulder surfaces being engageable with an outer surface of said pipe elements when said pipe elements are positioned within said central space.

17. The coupling according to claim 16, wherein said first arcuate shoulder surfaces on each of said segments are oriented such that the distance between said first arcuate shoulder surfaces and said axis increases with increasing distance along said axis in a direction away from said central space.

18. The coupling according to claim 16, wherein said first arcuate shoulder surfaces on each of said segments are oriented such that the distance between said first arcuate shoulder surfaces and said axis increases with increasing distance along said axis in a direction toward said central space.

19. The coupling according to claim 16, wherein said first arcuate shoulder surfaces have an orientation angle between about 1° and about 5°.

20. The coupling according to claim 16, wherein said first arcuate shoulder surfaces have an orientation angle of about 3°.

21. The coupling according to claim 16, wherein said first arcuate shoulder surfaces have a curved cross sectional profile.

22. The coupling according to claim 16, wherein each said segment further comprises a pair of second arcuate shoulder surfaces, each positioned between one of said first arcuate shoulder surfaces and a respective one of said arcuate keys, said second arcuate shoulder surfaces being angularly oriented with respect to said axis and having a slope opposite to a slope of an adjacent one of said first arcuate shoulder surfaces.

23. The coupling according to claim 22, wherein said second arcuate shoulder surfaces have an orientation angle between about 1° and about 5°.

24. The coupling according to claim 22, wherein said second arcuate shoulder surfaces have an orientation angle of about 3°.

25. The coupling according to claim 16 comprising two said segments.

26. The coupling according to claim 25, wherein said segments are attached to one another in spaced apart relation.

27. The coupling according to claim 16 further comprising a seal positioned in said cavity.

28. The coupling according to claim 16, further comprising:
connection members positioned at opposite ends of said segments for adjustably connecting said coupling segments to one another, said connection members being adjustably tightenable for drawing said arcuate shoulder surfaces into engagement with said outer surfaces of said pipe elements; and
wherein said first arcuate shoulder surfaces subtend an angle of less than 180° and have a minimum radius of curvature greater than the radius of curvature of said outer surfaces of said pipe elements, said segments being deformable upon adjustable tightening of said connection members so as to substantially conform the curvature of a portion of said first arcuate shoulder surfaces to the outer surfaces of said pipe elements.

29. The coupling according to claim 28, wherein said arcuate keys subtend an angle of less than 180° and have a radius of curvature greater than the radius of curvature of said outer surface of said pipe elements.

30. The coupling according to claim 29 comprising two said segments.

31. The coupling according to claim 30, wherein said segments are attached to one another in spaced apart relation.

32. A coupling for joining pipe elements together in end to end relation, said coupling comprising:
a plurality of segments attached to one another end to end surrounding a central space, at least one of said segments having a cavity therein, said cavity facing said central space and extending lengthwise along said one segment;
said one segment further comprising an arcuate key extending lengthwise along said one segment, said arcuate key being positioned in spaced relation to said cavity and projecting inwardly toward said central space;
said one segment further comprising an arcuate shoulder surface extending circumferentially along the length of said one segment, said arcuate shoulder surface facing said central space and being positioned contiguous with said cavity and between said cavity and said arcuate key, said arcuate shoulder surface having a first boundary adjacent to said key and a second boundary adjacent to said cavity, said first boundary having a first radius of curvature, said second boundary having a second radius of curvature, said first radius of curvature being different from said second radius of curvature.

33. The coupling according to claim 32, wherein said first radius of curvature is greater than said second radius of curvature.

34. The coupling according to claim 32, wherein said first radius of curvature is less than said second radius of curvature.

35. The coupling according to claim 32, wherein said arcuate shoulder surface has a curved cross sectional profile.

36. In combination, a pair of pipe elements and a coupling joining the pipe elements together in end to end relation, each of said pipe elements comprising:
a circumferential ring located at an end of each pipe element and extending radially outwardly therefrom;
and wherein said coupling comprises:
a plurality of segments attached to one another end to end surrounding a central space, each said segment having a cavity therein, each said cavity facing said central space and extending lengthwise along each said segment;
each said segment further comprising a pair of arcuate keys extending lengthwise along each said segment and projecting inwardly toward said central space, said arcuate keys being positioned in spaced relation to one another on opposite sides of said cavity;
each said segment further comprising a pair of first arcuate shoulder surfaces extending circumferentially along the length of each said segment and facing said central space, said first arcuate shoulder surfaces being positioned in spaced relation to one another on opposite sides of said cavity, each said first arcuate shoulder surface being positioned contiguous with said cavity and between a respective one of said arcuate keys and said cavity, said first arcuate shoulder surfaces being angularly oriented with respect to an outer surface of said circumferential rings, said ends of each of said pipe elements being positioned in end to end relation within said central space, a portion of each of said first arcuate shoulder surfaces being engaged with said outer surface of one of said circumferential rings positioned at said ends of said pipe elements.

37. The combination according to claim 36, wherein said first arcuate shoulder surfaces on each of said segments are oriented such that the distance between said first arcuate shoulder surfaces and said outer surface of said ring increases with increasing distance in a direction away from said central space.

38. The combination according to claim 36, wherein said first arcuate shoulder surfaces on each of said segments are oriented such that the distance between said first arcuate shoulder surfaces and said outer surface of said ring increases with increasing distance in a direction toward said central space.

39. The combination according to claim 36, wherein said first arcuate shoulder surfaces have an orientation angle between about 1° and about 5°.

40. The combination according to claim 36, wherein said first arcuate shoulder surfaces have an orientation angle of about 3°.

41. The combination according to claim 36, wherein said first arcuate shoulder surfaces have a curved cross sectional profile.

42. The combination according to claim 36, wherein each of said segments further comprises a pair of second arcuate shoulder surfaces, each positioned between a respective one of said first arcuate shoulder surfaces and said cavity, said second arcuate shoulder surfaces being angularly oriented with respect to said axis and having a slope opposite to a slope of an adjacent one of said first arcuate shoulder surfaces.

43. The combination according to claim 42, wherein said second arcuate shoulder surfaces have an orientation angle between about 1° and about 5°.

44. The combination according to claim 42, wherein said second arcuate shoulder surfaces have an orientation angle of about 3°.

45. The combination according to claim 36 comprising two said segments.

46. The combination according to claim 36, further comprising:
    connection members positioned at opposite ends of said segments for adjustably connecting said coupling segments to one another, said connection members being adjustably tightenable for drawing said first arcuate shoulder surfaces into engagement with said outer surfaces of said circumferential rings; and
    wherein said first arcuate shoulder surfaces subtend an angle of less than 180° and have a radius of curvature greater than the radius of curvature of said outer surfaces of said circumferential rings, said segments being deformable upon adjustable tightening of said connection members so as to substantially conform the curvature of a portion of said first arcuate shoulder surfaces to the outer surfaces of said circumferential rings.

47. The combination according to claim 46, wherein said arcuate keys subtend an angle of less than 180° and have a radius of curvature greater than the radius of curvature of said outer surface of said pipe elements.

48. The combination according to claim 47 comprising two said segments.

49. A method of joining pipe elements in end to end relationship using a coupling formed of a plurality of segments connected end to end by a plurality of adjustably tightenable fasteners, said segments being connected to one another in spaced apart relation, said segments surrounding a central space, at least one of said segments having a cavity therein, said cavity facing said central space and extending lengthwise along said one segment, said one segment further comprising an arcuate key extending lengthwise along said one segment, said arcuate key being positioned in spaced relation to said cavity and projecting inwardly toward said central space, said one segment further comprising an arcuate shoulder surface extending circumferentially along the length of said one segment, said arcuate shoulder surface facing said central space and being positioned contiguous with said cavity and between said cavity and said arcuate key, said arcuate shoulder surface being angularly oriented with respect to an axis oriented perpendicularly to a plane containing said segments, said method comprising:
    inserting said pipe elements into said central space from opposite sides of said coupling;
    tightening said fasteners so as to draw said segments toward one another and thereby engaging said arcuate shoulder surface with an outer surface of at least one of said pipe elements.

50. The method according to claim 49, wherein said arcuate shoulder surface subtends an angle of less than 180° and has a radius of curvature greater than the radius of curvature of said outer surface of said one pipe element, said method further comprising deforming at least said one segment upon adjustable tightening of said connection members so as to substantially conform the curvature of a portion of said arcuate shoulder surface to the outer surface of said one pipe element.

51. The method according to claim 49, wherein said coupling further comprises a seal positioned within said cavity, inserting said pipe elements into said central space from opposite sides of said coupling including engaging said seal with said pipe elements from opposite sides of said seal.

* * * * *